No. 673,621. Patented May 7, 1901.
J. M. MOODY & J. C. CHASE.
LIQUID BLACKING BRUSH.
(Application filed July 13, 1900.)
(No Model.)
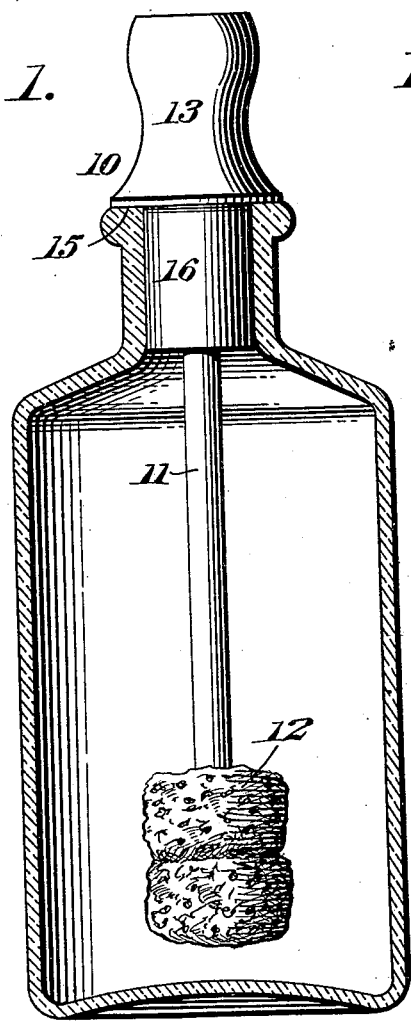
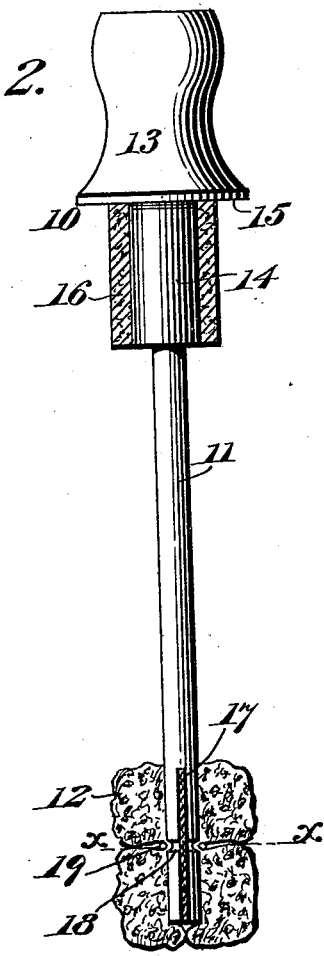
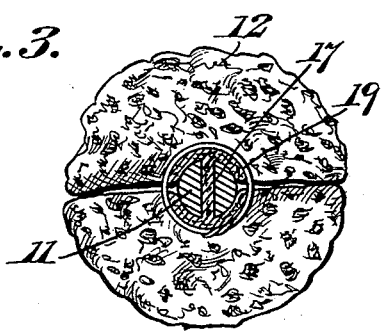
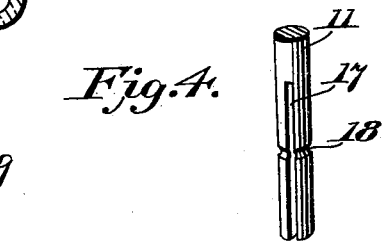
James M. Moody and
James C. Chase
Inventors

UNITED STATES PATENT OFFICE.

JAMES M. MOODY AND JAMES C. CHASE, OF HARWICH, MASSACHUSETTS.

LIQUID-BLACKING BRUSH.

SPECIFICATION forming part of Letters Patent No. 673,621, dated May 7, 1901.

Application filed July 13, 1900. Serial No. 23,500. (No model.)

*To all whom it may concern:*

Be it known that we, JAMES M. MOODY and JAMES C. CHASE, citizens of the United States, residing at Harwich, in the county of Barnstable and State of Massachusetts, have invented a new and useful Liquid - Blacking Brush, of which the following is a specification.

This invention relates to improvements in brushes for use with liquid blacking, mucilage, or similar material; and the object thereof is the provision of a simple device of this character having novel means for securely fastening the brush to the stem, which is provided with a handle that forms an efficient stopper for the bottle and a protection against soiling the hands of the user.

In the drawings which accompany and form a part of this specification the preferred form of the invention is illustrated, and in said drawings—

Figure 1 is a longitudinal sectional view of a bottle, showing the improved device applied thereto. Fig. 2 is a longitudinal section of the brush. Fig. 3 is an enlarged horizontal cross-section on the line *x x* of Fig. 2. Fig. 4 is a detail perspective view of the end of the shank with the brush-head removed.

Similar numerals of reference designate corresponding parts in all the figures of the drawings.

In carrying out the invention a stopper 10 is provided, from the lower end of which projects a stem 11, to which is attached the brush-head 12. The stopper 10 comprises a handle 13, which is provided with a suitable knob portion whereby the brush may be readily grasped by the user. From the lower end of the handle projects a cylindrical shank 14 of less diameter than the handle portion, thus forming a flat annular flange or shoulder 15 at the lower edge of said handle portion. The shank is preferably made integral with the handle portion to more securely prevent their being broken apart. Surrounding the shank 14 is a cylindrical sleeve 16, of cork or other suitable compressible material, which is adapted to fit tightly against the inner wall of the bottle-mouth. Secured to or made integral with the shank 14 and projecting from the lower end thereof is the stem 11, the free end of which is provided with a longitudinal slit 17, and an annular groove 18 is cut in the periphery of said stem intermediate the ends of the slit 17. A sponge 12 or similar absorbent material has a central portion thereof drawn or forced into the slit 17, and a cord or wire 19 is bound tightly and closely about the stem 11 and also engaging with the material 12, so as to force an intermediate portion thereof into the groove 18. By this construction the handle portion is firmly fixed to the stopper and the flange 15 prevents the liquid running upon the handle portion, and thus protects the hands of the user. At the same time the binder 19 firmly clamps the two sections of the stem upon the sponge, and forcing a portion thereof into the groove 18 holds the same against all longitudinal movement and prevents its sliding off the end of the stem. The annular groove may, however, be omitted and the binder may be secured tightly around the material at the bifurcated end, thus clamping the latter securely upon the material arranged in the slit.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having now described the invention, what we claim as new, and desire to secure by Letters Patent, is—

1. A device of the class described, comprising a handle carrying a stem provided at one end with a longitudinally-disposed slit, absorbent material arranged in said slit and about the stem, and a flexible binder bound tightly around said material and clamping the bifurcated end of the stem upon the material arranged between the same.

2. A device of the class described, comprising a handle carrying a stem provided at one end with a longitudinally-disposed slit, said stem also having an exterior annular groove intersecting said slit and located at a point intermediate its ends, absorbent material arranged in said slit and about the stem, and a continuous flexible binder bound tightly around said material clamping the bifurcated end of the stem upon the material arranged between the same and forcing a portion of it into said groove.

In testimony that we claim the foregoing as our own we have hereto affixed our signatures in the presence of two witnesses.

JAMES M. MOODY.
JAMES C. CHASE.

Witnesses:
SAMUEL A. ELLIS,
BEN. L. BARDWELL.